July 29, 1930.                H. SHAPIRO                1,771,513
                                DIAL
                          Filed June 26, 1925

INVENTOR
Hyman Shapiro
BY
Dean, Fairbanks, Obright & Hirsch
his ATTORNEYS

Patented July 29, 1930

1,771,513

UNITED STATES PATENT OFFICE

HYMAN SHAPIRO, OF NEW YORK, N. Y., ASSIGNOR TO ARTHUR DORSEY, OF NEW YORK, N. Y.

DIAL

Application filed June 26, 1925. Serial No. 39,796.

My present invention relates primarily to radio apparatus, and has particular reference to an indicating dial for apparatus having a movable spindle.

An object of the invention is to provide an indicating dial for a piece of apparatus of the type referred to, which dial will allow very delicate and accurate adjustment of the movable spindle, and which will be of simple construction, inexpensive to manufacture, and easily manipulated without the need for special skill.

Another object is to provide means for controlling the adjustments of the spindle with precision, and for making it possible accurately to repeat or duplicate predetermined adjustments with great facility.

Another object is to provide indicating means movable with respect to the dial whereby a relatively small movement of the spindle may be effected by a comparatively large movement of the indicating means.

In a preferred embodiment, the dial is provided with two graduated scales, and the spindle is operatively connected with indicating means movable with respect to each scale, one of said movements registering relatively coarse, and the other, relatively fine, adjustments of the spindle.

According to one feature of the invention, one of the indicating means is arranged to be directly movable with the spindle and constitutes the main or coarse indicating means, while the other is operatively connected with the spindle through speed reducing means, and constitutes auxiliary or fine indicating means, movement of which will cause relatively slow movement of the spindle.

Another feature of the invention lies in providing the speed reducing means in the form of an internal gear and spur gear engagement, the former being movable with the spindle and the main indicating means, and the spur gear being movable with the auxiliary indicating means.

In a preferred embodiment, the auxiliary means is rotatably mounted in a dial, and the scales are arranged concentrically with respect to the spindle and the spur gear.

I prefer also to provide the main indicating means in the form of a single pointer element, and to constitute the auxiliary means of a plurality of radiating pointer elements.

Another feature lies in mounting the dial concentrically with respect to the spindle, and providing it with a bearing for the spindle and with a bearing portion in the form of a boss for the spur gear mounting. The radiating pointed elements are preferably provided at the inner edge of a skirt rotatably mounted over the boss so that they will lie close over the dial face.

In one form of construction the dial is made to overlie the gears, and is secured to a panel or similar mounting member by means of one or more bolts or screws. In a modified embodiment, the periphery of the dial is provided with an annulus or washer of rubber or similar material which will lie between the dial and the panel and hold the former stationary with respect to the panel by the mere pressure therebetween.

In the accompanying drawings, illustrating by way of example a preferred embodiment of the invention, Figure 1 is a front elevation of an indicating dial operatively mounted upon a panel;

Figure 1:
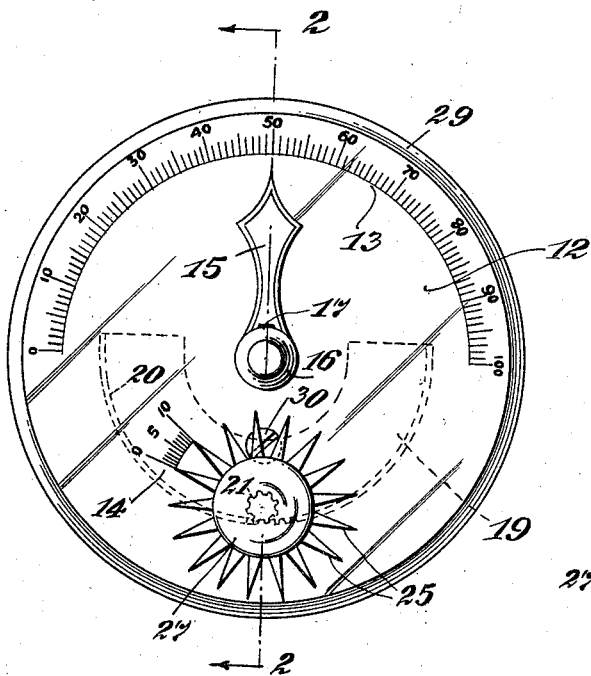
Figure 2:
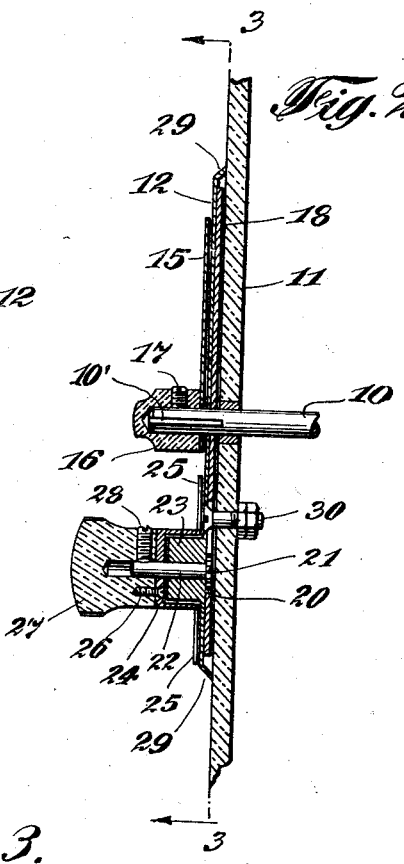
Figure 2 is a cross section along the line 2—2 of Figure 1.
Figure 3:
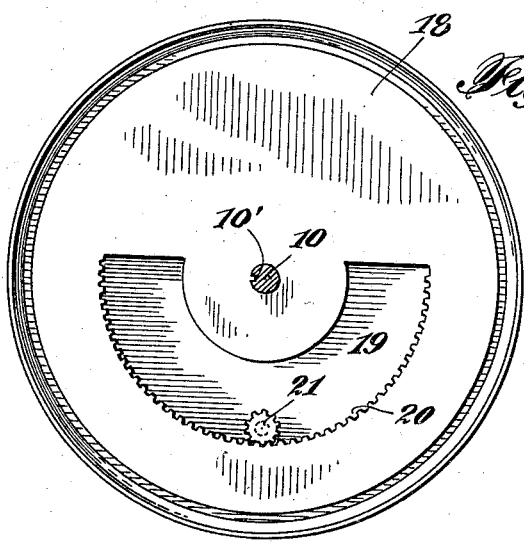
Figure 3 is a cross-section along the line 3—3 of Figure 2, some parts being omitted for the sake of clearness.

Referring to the drawings, and particularly to Figures 1 and 2, I have shown the movable spindle 10 of a piece of radio apparatus (not shown) but which may be suitably mounted in back of a panel 11 in the usual way, extending through the panel and through an opening constituting a bearing in a dial 12 which is mounted concentrically with respect to the spindle on the front face of the panel. The dial is provided with two graduated scales 13 and 14, the former of which is arranged along an arc concentric with the spindle and along the path of the tip of an indicating pointer 15 which is movable over the dial and with the spindle 10. I have illustratively shown a collar 16 secured as by a set of screws 17 to the spindle 10 and carrying the pointer 15.

Movable with the spindle, and preferably keyed thereto and lying between the dial and the panel, is a disc 18 having a segmental opening 19 provided with teeth constituting an internal gear 20. Meshing therewith is a spur gear 21 carried by a shaft 22 rotatably mounted in a bearing portion 23 of the dial on an axis parallel to that of the spindle 10. The graduated scale 14 is arranged along an arc concentric with the axis of the shaft 22. The bearing portion 23 preferably comprises a circular boss formed integral with the dial, and rotatably mounted over the boss is the auxiliary indicating means preferably comprising a skirt 24 having radially disposed pointer elements 25 extending from its inner end and along the face of the dial to proximity with the arc of scale 14. The auxiliary indicating means is made movable with the shaft 22 by any suitable means, and I have illustratively shown the skirt 24 attached by one or more countersunk screws 26 to a knob or handle member 27 overlying the end surface of the skirt and locked to the shaft 22 by a set screw 28.

The dial may be provided with an inwardly turned periphery 29 to enclose the gears, and may be fixed to the panel by a suitably positioned bolt, such as the countersunk bolt 30 shown by way of example as passing through the opening 19 so as not to interfere with the free movement of the disc 18.

Figure 4:
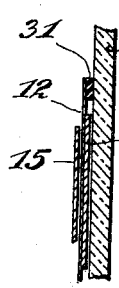
Figure 4 is a fragmentary cross-section similar to Figure 2 illustrating a modified form of dial.

In the modified form illustrated in Fig. 4, the periphery of the dial is provided on its inner side with an annular washer 31 of rubber or similar material adapted to bear against the panel 11 and retain the dial in fixed position relative to the panel by the pressure exerted upon the dial through the intermediary of the pointer 15 by the collar 16, the need for bolts being thereby obviated.

It will be evident that rotation of the auxiliary indicating means will cause a relatively slow rotation of the spindle 10, and that very fine adjustments of the position of the latter are thereby made possible. Furthermore, by merely resetting the auxiliary indicating means relative to the scale 14, predetermined accurate adjustments of the spindle may be repeated at intervals of time with great ease.

Although the gear ratio may be varied in accordance with differing requirements, I have found it preferable to provide the teeth in such a ratio that the arc of the scale 14 extending between two adjacent pointer elements 25 may be divided into ten equal divisions which will correspond to a unit division of the scale 13, the parts being so set that when a pointer element 25 is at an extremity of the auxiliary scale 14, the main pointer 15 is on one of its scale divisions. The latter is preferably divided into 100 divisions per arc of approximately 180° (see Fig. 1), and the gear ratio required to achieve the desired result will be dependent upon the number of pointer elements 25. The number of these elements may be chosen at will, and the gear ratio computed in accordance therewith, or if desired, the gear ratio may be first decided upon, in which case the number of pointer elements must be determined accordingly.

Thus, as an example of a possible design, if there are 18 pointer elements on the auxiliary indicating means, the gear ratio must be such that 1/18 of a revolution of the spur gear will cause a rotation of the spindle through 1/100 of 180°, or 1.8°. One complete revolution of the spur gear will then cause a rotation of the spindle through 18×1.8°, and if the spur gear has 12 teeth, the internal gear will have to have 12 teeth per arc of 18×1.8° or 66.66 teeth per arc of 180°.

If the gear ratio and the number of pointer elements 25 are designed in this preferred manner with the foregoing object in view, the effect will be to permit accurate adjustment and readjustment of the spindle to 1/1000 of a semi-revolution. In the case of variable plate condensers, wherein no motion exceeding a semi-revolution is ever necessary, an extremely accurate and easily controllable registering adjustment is therefore made possible. The auxiliary indicating means is first rotated comparatively quickly to bring the spindle and the pointer 15 into approximate position readable on the scale 13, and thereafter the auxiliary means is moved more slowly to position one of the pointer elements 25 accurately with respect to the scale 14. This last step allows an adjustment to be made which would not be readable upon scale 13, but which is readable upon scale 14 and in effect sets the spindle and the pointer 15 at any desired predetermined subdivision of a unit marking of scale 13. Preferably the collar 16 is so formed as to afford no ready handhold, so that the strain on the gear teeth is avoided, which might be incurred were a user to attempt to set the device by directly turning collar 16.

It will be obvious that various changes in the details that have been herein described and illustrated in order to explain the nature of my invention, may be made by those skilled in the art without departing from the principle and scope of the invention as expressed in the appended claims.

Having thus described my invention what I claim as new and desire to secure by Letters Patent is:

1. In radio apparatus of the character described, in combination, a dial having two graduated scales thereon, indicating means movable with respect to each scale, common manually operable means for moving said indicating means and speed-reducing means operatively connecting said indicating means whereby movement of one will cause concurrent relatively slow movement of the other.

2. In radio apparatus having a rotatable spindle, in combination, an internal gear carried by the spindle, a spur gear meshing therewith, a shaft for the spur gear, a fixed dial overlying the gears and having bearings for said spindle and shaft, said dial having a main graduated scale along an arc concentric with the spindle and an auxiliary graduated scale along an arc concentric with the shaft, a pointer carried by the spindle and movable with respect to the main scale, and auxiliary indicating means comprising a plurality of radially disposed pointers carried by the shaft and movable with respect to the auxiliary scale.

3. In radio apparatus having a rotatable spindle, in combination, an internal gear carried by the spindle, a spur gear meshing therewith, a shaft for the spur gear, a dial concentrically mounted with respect to the spindle and having a bored boss constituting a bearing for said shaft, and indicating means carried by the shaft and movable over the dial, said indicating means comprising a skirt overlying the boss and radially disposed pointer elements carried by the skirt adjacent the face of the dial.

4. In radio apparatus having a rotatable spindle, in combination, an internal gear carried by the spindle, a spur gear meshing therewith, a shaft for the spur gear, a dial overlying the gears and having bearings for said spindle and shaft, said dial having a main graduated scale along an arc concentric with the spindle and an auxiliary graduated scale along an arc concentric with the shaft, relatively movable indicia on the spindle and dial and auxiliary indicating means carried by the shaft and movable with respect to the auxiliary scale.

5. In radio apparatus having a rotatable spindle, in combination, an internal gear carried by the spindle, a spur gear meshing therewith, a shaft for the spur gear, a fixed dial overlying the gears and having bearings for said spindle and shaft, said dial having a main graduated scale along an arc concentric with the spindle and an auxiliary graduated scale along an arc concentric with the shaft, and relatively movable indicia on the spindle and dial.

6. In radio apparatus having a rotatable spindle, in combination, an internal gear carried by the spindle, a spur gear meshing therewith, a shaft for the spur gear, a dial concentrically mounted with respect to the spindle and having a bored boss constituting a bearing for said shaft, engaging means carried by the spindle, and a second indicating means carried by the shaft for the spur gear.

7. As an article of manufacture, indicating means for a dial of the character described comprising a cylindrical skirt portion and a plurality of radial pointers carried at one end thereof.

Signed at New York city, in the county of New York and State of New York this 28th day of May A. D. 1925.

HYMAN SHAPIRO.